Apr. 3, 1923.

H. W. SMOLK 1,450,235

MACHINE FOR USE IN MANUFACTURING TIRE TUBES

Filed June 29, 1920

2 sheets-sheet 1

Inventor
H. W. Smolk

Apr. 3, 1923.

H. W. SMOLK 1,450,235

MACHINE FOR USE IN MANUFACTURING TIRE TUBES

Filed June 29, 1920

2 sheets-sheet 2

Inventor

H. W. Smolk

By Fisher & Moser

Attorney

Patented Apr. 3, 1923.

1,450,235

UNITED STATES PATENT OFFICE.

HARRY W. SMOLK, OF CLEVELAND, OHIO.

MACHINE FOR USE IN MANUFACTURING TIRE TUBES.

Application filed June 29, 1920. Serial No. 392,667.

*To all whom it may concern:*

Be it known that I, HARRY W. SMOLK, a citizen of the United States, residing at Cleveland, in the county of Cuyahoga and State of Ohio, have invented certain new and useful Improvements in a Machine for Use in Manufacturing Tire Tubes, of which the following is a specification.

My object is to provide a rack and drier adapted to expedite and facilitate the manufacture of rubber tire tubes. Following a common practice, the opposite ends of a rubber tube are scarfed, then cemented, and the cement partly dried and brought to the right consistency before telescoping and uniting said ends together to make an annular tire. Heretofore, it has been customary to employ several workmen to carry the tubes back and forth from one station to another during their development, and this work is generally done in a room kept at a high temperature or the tubes are placed for an interval in a drier. My conception is to provide an endless carrier to convey the tire tubes in a circuit while distributing heat to the cemented ends thereof, whereby one or more persons may be stationed at intervals in the path of travel of the tubes to do an appointed task. Thus, one workman may be engaged solely in folding the ends of the tube and in hanging the tube in position upon the conveyor, another person may be engaged solely in applying the cement to the folded ends of the tube while in transit, and still another individual may be positioned near the end of the travel of the tubes to remove them from the conveyor and to unite the ends.

Figure 1:
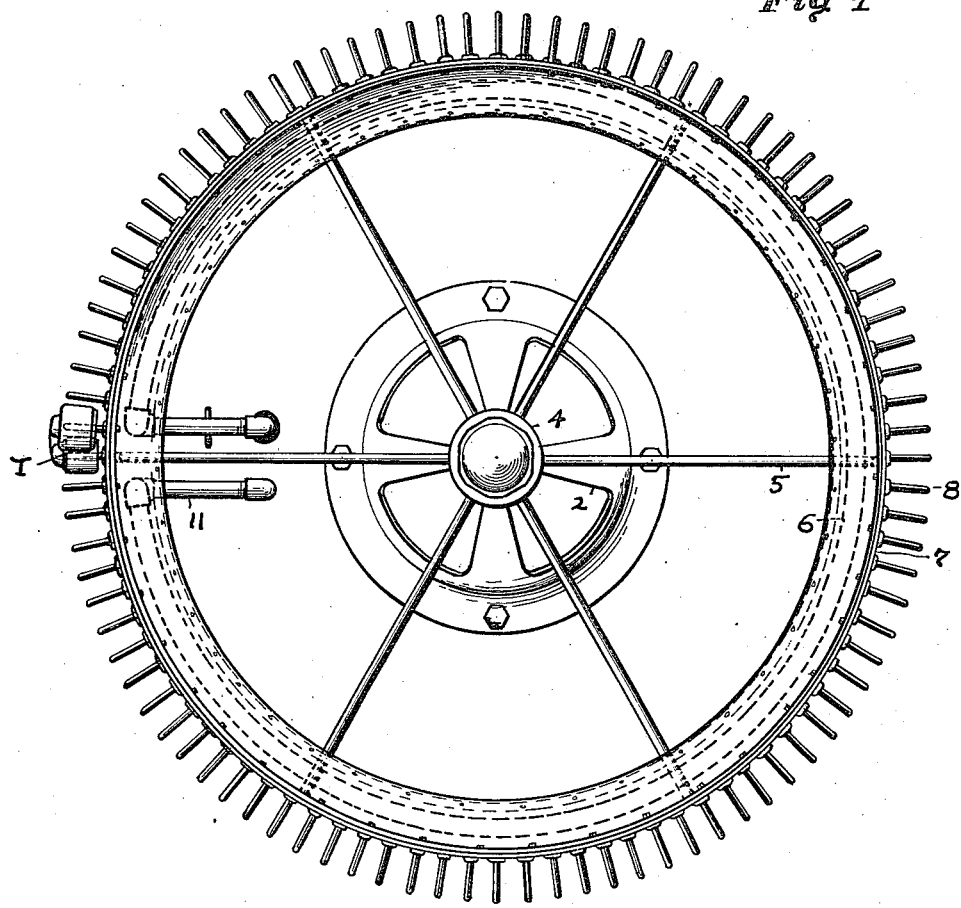
Figure 2:
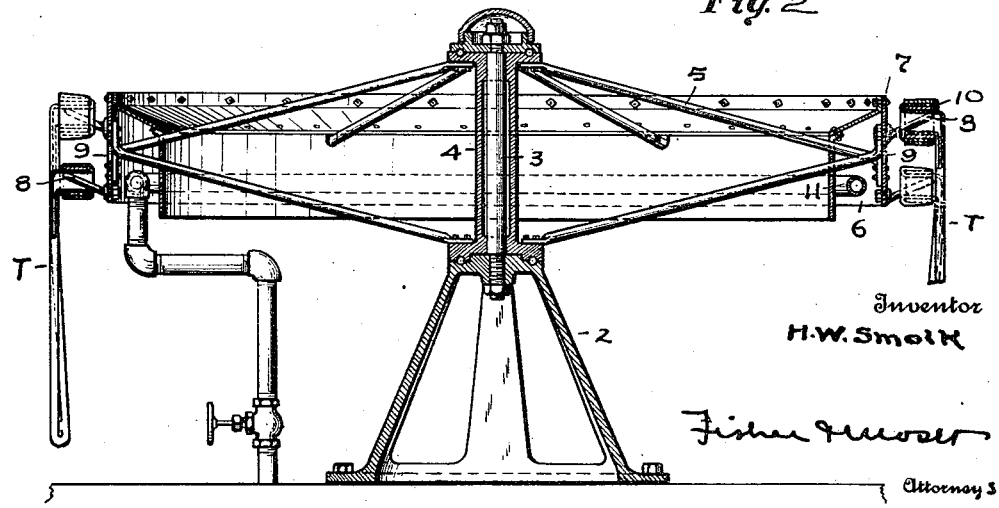
Figure 3:
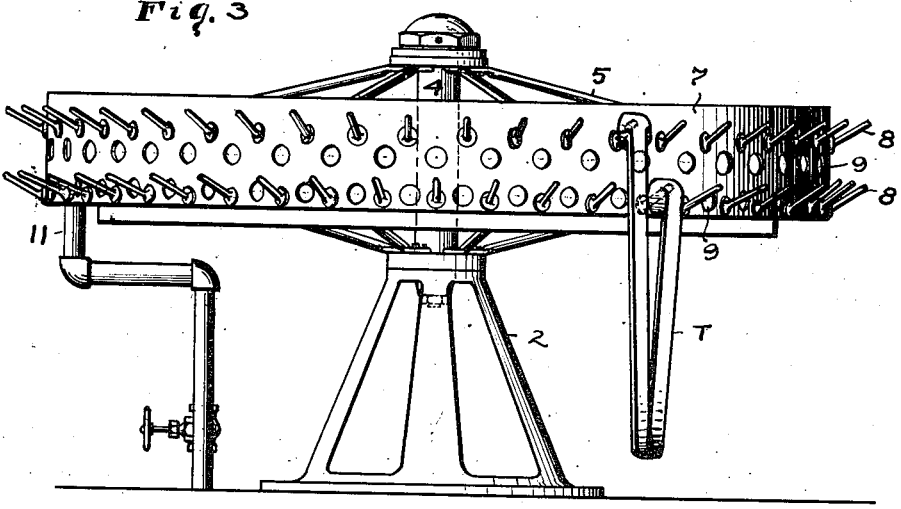
Figure 4:
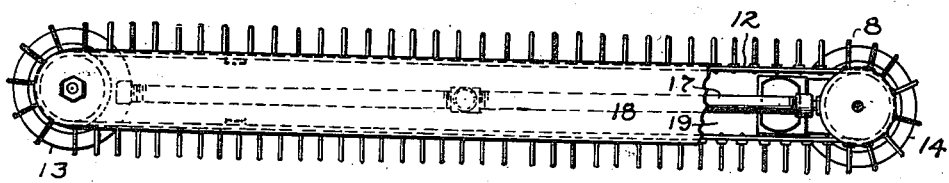
Figure 5:
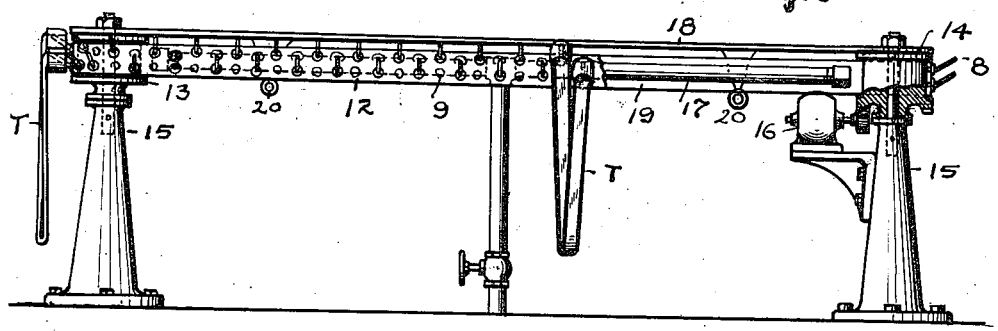

In the drawings accompanying this application, Fig. 1 is a plan view of a revolving conveyor and drying rack, showing one tube suspended thereon and Fig. 2 is a vertical section centrally through the device showing two tubes hanging on the pegs on opposite sides of the wheel. Fig. 3 is a side elevation of the device. Figs. 4 and 5 are plan and side views respectively, partly in section, showing a modified form of the invention.

Referring to Figs. 1, 2 and 3 the invention as shown therein comprises a base 2 having a vertical post 3 adapted to support the hub 4 of a relatively large wheel 5 which is particularly constructed at its periphery to permit a large number of rubber tire tubes T to be suspended in close relation and successively around the circumference thereof opposite an annular heat-distributing chamber 6. The peripheral face of the wheel is preferably in the form of a wide perforated band 7 having inclined pegs or pins 8 projecting outwardly and upwardly therefrom at uniformly spaced intervals opposite and intermediate the perforations or openings 9, and with the pegs preferably arranged in two rows one above the other and the pegs in one row in staggered relation to the pegs in the other row so that the maximum number of tubes may be suspended upon a wheel of a given diameter and so that each end of the tube may be slipped into position and removed independently and without interference. Inclined pegs also facilitate the placement and removal of the tubes and hold the ends of the tubes securely in position.

As a preliminary step to placing the tubes on the pegs a ferrule or thimble 10 is sleeved either within or over each end of the tube and the end of the tube folded or lapped back with a single fold at one end and with a double fold at the opposite end of the tube, the object being to expose the inner scarfed surface of one end of the tube and in the other instance to expose the outer scarfed end of the tube so that cement may be applied thereto. The operator who places the tubes upon the pegs may also apply the cement, or another person may be employed to apply the cement at another station in the circuit traveled by the pegs and tubes. When the cement has been applied the heat derived from the circle or coil of pipe 11 within the lower open end of chamber 6, acts to dry the cement on the tube ends inasmuch as the hot air passes outwardly around the ends of the tubes by way of openings 9. When the cement has dried sufficiently to effect splicing, the tube is removed and the splicing of the tube is completed in another operation. The pegs are then free to receive another tube as the wheel revolves to the place of beginning.

The wheel may be rotated by one of the operators, or it may be power driven as shown in Figs. 4 and 5. In this modified form of the invention an endless band 12 is supported upon sheaves or pulleys 13 and 14 mounted on standards 15, and a motor 16 is geared to drive pulley 14. A steam pipe 17 extends lengthwise of the conveyor between the two stretches of the band 12, and a plate or cover 18 is fixed in overlapping relation to the conveyor band to provide a heat distributing chamber 19 the full length of the conveyor. Similar pegs 8 and openings 9 are also employed in this form of the invention, and the conveyor may be of any desired length, but when greatly extended suitable idler wheels 20 or their equivalent will be used at intervals to support the band and the tubes thereon in their travel.

The conveyor and the means for supporting it may be constructed in various ways without departing from the spirit and scope of my invention, and the wheel may be either round or of other shape, and the band conveyor may be made of any suitable material and have the form of a continuous belt or a link chain.

What I claim is:

1. A traveling carrier having means adapted to suspend the splicing end of a divided tire tube in slip connection thereupon and a heating device paralleling said traveling carrier opposite the said suspensory means for said tire.

2. A cementing and drying rack for tire tubes, comprising a rotary member having a series of inclined pegs adapted to support the splicing ends of the tire tubes and provided with a heating chamber opposite said pegs, in combination with a heating device within said chamber.

3. In a cementing and drying rack for tire tubes, comprising a rotatable wheel having an annular heating chamber and a series of pegs extending from its periphery opposite said chamber and upon which the tire tubes are adapted to be removably supported.

4. A rotary cementing and drying rack, comprising a wheel having a heat-distributing chamber at its circumference and provided with supporting pegs for the tire tubes and heat passages open to said chamber in close proximity to said pegs.

5. A cementing and drying rack for tire tubes, comprising a rotatable wheel having a double row of inclined pegs arranged in staggered relation upon its periphery and adapted to support the splicing ends of a multiple number of tire tubes thereon.

6. In a machine as described, an endless conveyor for tire tubes adapted to receive both ends of a divided tube on different horizontal planes and means to heat the ends of said tubes while in transit.

7. A conveying and drying apparatus for tire tubes comprising an endless conveyor having means adapted to support a divided tire tube at both its ends in parallel planes and in suspensory position about the outside thereof.

8. A device for conveying and drying a divided tire tube comprising a moving carrier having inclined pegs about its outside in staggered relation in different planes and adapted to support the divided ends of the tire tube in slip connection therewith.

9. A tire tube carrier adapted to travel in a circuit having projecting elements at different elevations about its outside adapted to sleeve the ends of a divided tire tube thereon and to be suspended therefrom and provided with a heat distributing chamber adjacent said elements.

10. A drying rack for tire tubes comprising a rotary member having pegs about its outside in different planes and adapted to support a divided tire tube at its respective ends, in combination with heating means opposite said pegs.

Signed at Willoughby, in the county of Lake and State of Ohio, this 17th day of June, 1920.

HARRY W. SMOLK.